United States Patent [19]

Mitsuda et al.

[11] Patent Number: 4,910,101
[45] Date of Patent: Mar. 20, 1990

[54] STACKED TYPE FUEL CELL

[75] Inventors: Kenro Mitsuda; Toshiaki Murahashi; Hisashi Shiota, all of Amagasaki, Japan

[73] Assignee: Mitsubishi Denki Kabushiki Kaisha, Japan

[21] Appl. No.: 277,962

[22] Filed: Nov. 30, 1988

[30] Foreign Application Priority Data

Dec. 2, 1987 [JP] Japan .................. 62-306124

[51] Int. Cl.⁴ .............................. H01M 8/02
[52] U.S. Cl. ......................... 429/38; 429/34
[58] Field of Search ............... 429/14, 34, 35, 36, 429/37, 38, 39

[56] References Cited

U.S. PATENT DOCUMENTS

| | | | |
|---|---|---|---|
| 4,345,008 | 8/1982 | Breault | 429/26 |
| 4,366,211 | 12/1982 | Pollack | 429/38 |
| 4,463,066 | 7/1984 | Adlhart et al. | 429/34 |
| 4,596,749 | 6/1986 | Congdon et al. | 429/14 |
| 4,612,262 | 9/1986 | Grevstad | 429/34 |
| 4,767,680 | 8/1988 | Hijikata et al. | 429/39 |

FOREIGN PATENT DOCUMENTS 59-108278 6/1984 Japan .

*Primary Examiner*—Donald L. Walton
*Attorney, Agent, or Firm*—Leydig, Voit & Mayer

[57] ABSTRACT

A fuel cell having a receiver extending from a side surface of a stacked-cell body of a fuel cell and adapted to receive surplus electrolyte falling along the side surface, and a barrier disposed on the receiver and adapted to catch the electrolyte discharged from a reserve plate while partially restricting an opening which serves as the outlet of a reaction gas flow path. The electrolyte discharged from one single cell can positively be recovered and returned to the same single cell without causing any substantial pressure loss.

10 Claims, 5 Drawing Sheets

STACKED TYPE FUEL CELL

BACKGROUND OF THE INVENTION

1. Field of the Invention

This invention relates to a stacked type fuel cell and, more particularly, to a design enabling recovery of the electrolyte in the stacked-cell body of the fuel cell.

2. Description of the Related Art

As is well known, a fuel cell is a kind of generator which has fuel electrodes and oxidant electrodes facing each other, an electrolyte matrix being provided between these electrodes, and the fuel cell is operated while being supplied with a fuel gas and an oxidant gas.

Fuel cells are grouped into the phosphoric acid type, the sulfuric acid type, the alkali type, the molten carbonate type and so on depending upon the kind of electrolyte employed.

The following description is made with respect to a phosphoric acid type of fuel cell by way of example. However, the same can be said with respect to other types of fuel cells.

In a stacked type of fuel cell using a liquid electrolyte during operation, e.g., a phosphoric acid type of fuel cell, there is a problem in that the electrolyte escapes from the cell and drips flow downward on the side of the stacked-cell body if the moisture absorption expansion heightens.

FIG. 1 shows a perspective view of a stacked type of fuel cell, such as the one disclosed in Japanese patent Laid-Open No. 59-108278, which is constituted by single cells and gas separating plates which are stacked alternately. Seal members 21 for retaining the phosphoric acid are disposed between the single cell 20 layers. Receivers 1 for receiving a certain amount of electrolyte are provided on a side surface of a stacked-cell body 1A of the full cell such as to extend outwardly from the gas separating plates 2. The receivers 1 are also used at the time of replenishment of the electrolyte on the basis of a method of directly supplying the electrolyte to the receivers 1 or a method of flowing a large amount of diluted electrolyte over the uppermost stage of the stacked-cell body 1A so that the amounts of electrolyte received by the receivers 1 are absorbed by the respective cells. Concerning the latter, Japanese Patent Laid-Open No. 61-47073 (U.S Pat. No. 4,596,749) discloses details of the procedure of replenishing an electrolyte to a fuel cell having the same cell structure as that shown in FIG. 1.

It is possible, with the receivers 1 shown in FIG. 1, to recover any electrolyte dripping from reaction gas flow paths and the seal members 21. However, it is impossible to recover that part of the electrolyte which is discharged as vapor and mist through the reaction gas flow paths together with the reaction gas.

A method of recovering electrolyte vapor and electrolyte mist is disclosed in Japanese Patent Laid-Open No. 57-12607 (U.S. Pat. No. 4,345,008). In this method, outlet portions of the reaction gas flow paths are filled with a porous material while the number of cooling pipes disposed in the vicinity of these flow paths is increased in order to reduce the temperature of the flow paths, thereby enabling the electrolyte to be caught together with any condensed water generated in the fuel cell. However, since the outlet portions of the reaction gas flow path are filled with a porous material, pressure loss takes place owing to the condensation of the generated water, and the pressure loss changes to a large extent depending upon the degree of condensation of the generated water including the electrolyte, which is a serious problem. For this reason, it is possible that the flow rate will be reduced to almost zero in some of the reaction gas flow paths while suitable low rates are maintained in other flow paths, resulting in serious deterioration of the cell characteristics and in a reduction in the life of the cell. In addition, since the reaction gas flows against the resistance of the porous members, the electrolyte tends to be discharged again in the form of mist from the porous members to the side of the stacked-cell body, and it is not possible to recover the amount of electrolyte thereby discharged.

The thus-constructed conventional stacked-type fuel cell lacks a means to effectively recover any electrolyte flowing out or discharged as vapor and/or mist from respective cells and return them to the cells. Thus, in the conventional arrangement, there is a problem of cross-over due to insufficiency of electrolyte in the cell or of corrosion of the exhaust gas piping due to attachment of the electrolyte thereto.

SUMMARY OF THE INVENTION

In view of the above-described problems, it is an object of the present invention to provide a stacked-type fuel cell capable of recovering any electrolyte discharged from single cells and returning the recovered electrolyte to the single cells without causing any substantial pressure loss.

To this end, the present invention provide a stacked type fuel cell including: a stacked-cell body formed of a plurality of gas separating plates and a plurality of single cells alternately stacked on each other, each of the single cells having an electrolyte matrix, anode and cathode electrode layers disposed on both surfaces of the electrolyte matrix, an anode reserve plate having at least one channel serving as a fuel gas flow path, and a cathode reserve plate having at least one channel serving as an oxidant gas flow path, the anode reserve plate and the cathode reserve plate being respectively disposed on the reverse surfaces of the anode layer and the cathode layer; reaction gas supply and reaction gas discharge manifolds disposed on side surfaces of the stacked-cell body; at least one receiver extending from the side surface of the stacked-cell body inside the discharge manifold, the receiver being adapted to receive surplus electrolyte falling along the side surface; and a barrier disposed on the receiver and adapted to catch an amount of electrolyte discharged from at least one of the reserve plates while partially opening the outlet of corresponding one of the reaction gas flow path.

In the present invention, an electrolyte loss in the fuel cell can be decreased, thereby obtaining long-life fuel cell.

DESCRIPTION OF THE PREFERRED EMBODIMENTS

Embodiments of the present invention will be described below with reference to the accompanying drawings.

Figure 1:
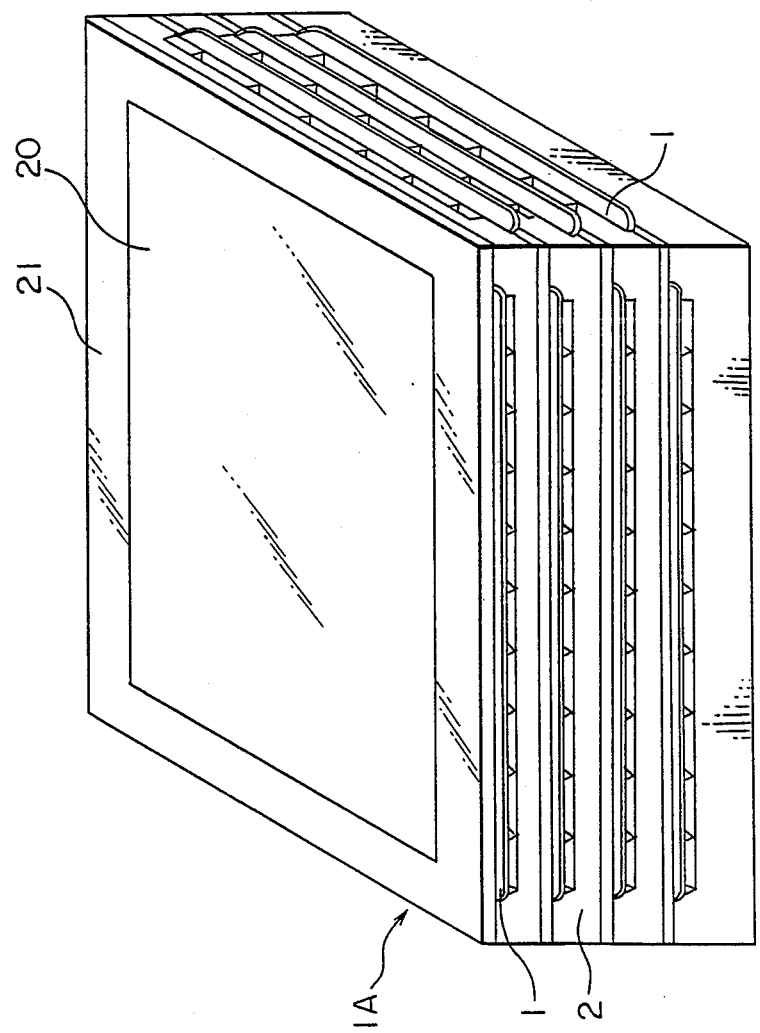
FIG. 1 is a perspective view of a conventional stacked type of fuel cell.
Figure 2:
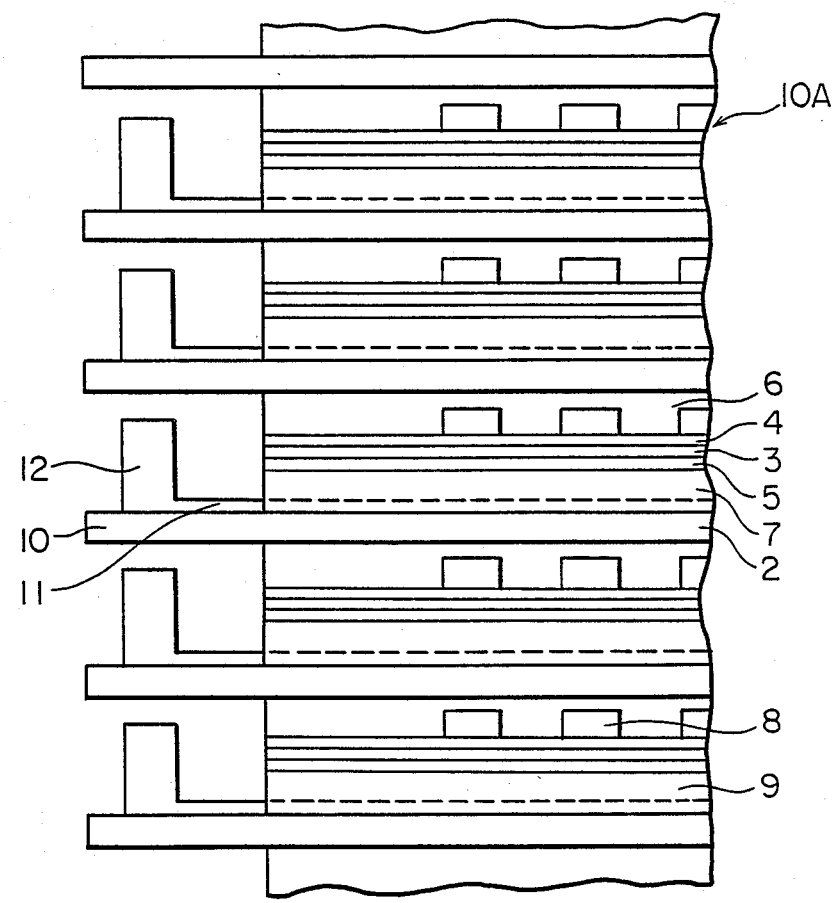
FIG. 2 is a side view of a stacked type of fuel cell which represents an embodiment of the present invention.

FIG. 2 is a side view of essential portions of a stacked-type fuel cell in accordance with the present invention which has receivers 10 extending outward from a side surface of a stacked-cell body 10A of the fuel cell and barriers 12 formed on the receivers 10 in order to catch electrolyte vapor and electrolyte mist. The receiver 10 are formed in such a manner that portions of gas separating plates 2 are extended outward from the side of the stacked-cell body 10A. An anode base layer or material 4 and a cathode base layer or material 5 are respectively disposed on the obverse and reverse surfaces of each of active components 3 constituted by, for example, a catalyst layer and an electrolyte matrix. An anode reserve plate 6 and a cathode reserve plate 7 are disposed on the reverse surfaces of the base material 4 and 5, respectively. Seal members (not shown) are provided on outer peripheral portions of the base material 4. Reaction gas flow paths 8 which are defined by recessed or projecting portions and which serve as fuel gas flow paths are formed in the plate 6, while oxidant gas flow paths 9 which are also defined by recessed or projecting portions and which serve as oxidant gas flow paths are formed in the plate 7. At least a portion of the barrier 12 disposed on the receiver 10 is formed from a porous material, and each barrier 12 defines an opening through which the reaction gas flow paths formed between the receivers 10 communicate with the outside of the stacked-cell body, a portion of the opening being restricted. A return member 11 made of a porous member is formed on each receiver 10 such that it connects the barrier 12 and the cathode reserve plate 7 to each other. The height of the barrier 12 in the stacking direction is greater than the height of the oxidant gas flow path 9 in the stacking direction.

Figure 3:
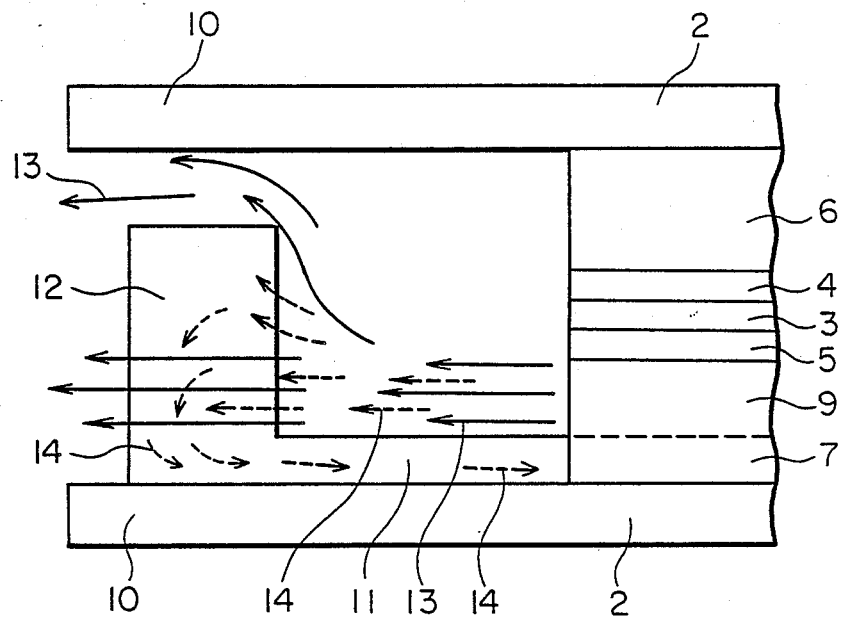
FIG. 3 is an enlarged side view of essential portions of the fuel cell shown in FIG. 2.

FIG. 3 is an enlarged diagram of essential portions of the fuel cell shown in FIG. 2. In FIG. 3, the solid line arrows 13 indicate flows of reaction gas while the broken line arrows 14 indicate flows of electrolyte vapor or mist.

Figure 4:
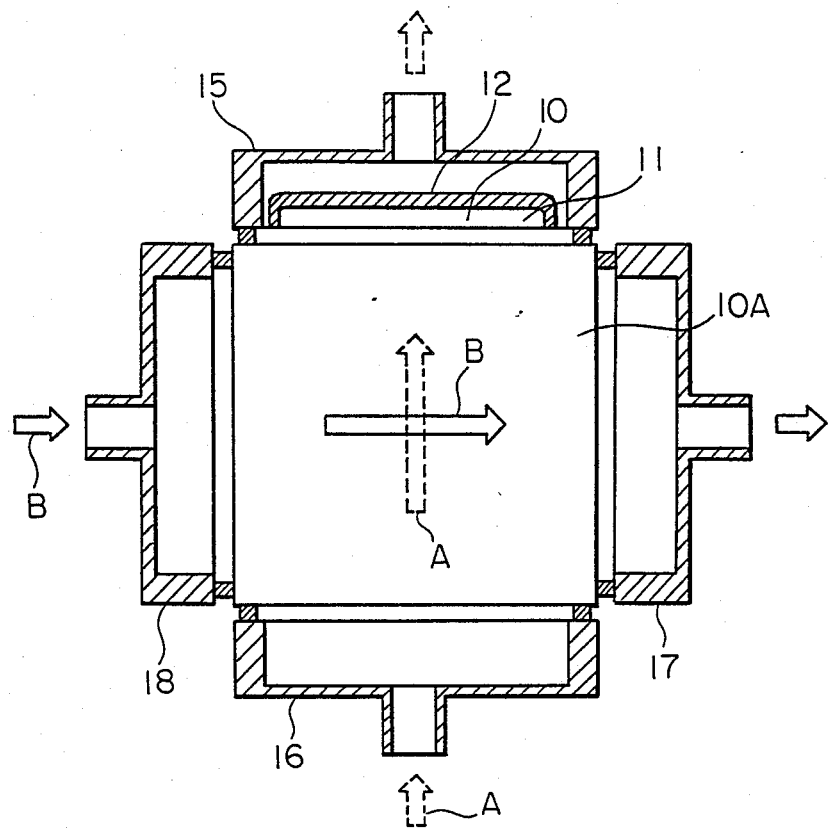
FIG. 4 is a plan view of the fuel cell shown in FIG. 2, illustrating the relationship between reaction gas supply and discharge manifolds, the receiver and the barrier.

FIG. 4 shows in plan the positional relationship between manifolds, the receiver and the barrier. As shown in FIG. 4, an oxidizing gas outlet manifold 15 and an oxidizing gas inlet manifold 16 are provided on opposite sides of the stacked-cell body 10A, while fuel gas outlet manifold 17 and a fuel gas inlet manifold 18 are provided on the other opposite sides of the stacked-cell body 10A. Flows of oxidant gas and fuel gas are indicated by arrows A and B, respectively.

The functions of the base materials 4 and 5 and the reserve plates 6 and 7 are described in detail in Japanese Patent Laid-Open No. 62-160662.

The operation in accordance with the present invention will be described below. Referring to FIG. 3, the reaction gas is discharged from the oxidant gas flow path 9 together with generated water, electrolyte vapor and electrolyte mist, and collides with the barrier 12. Electrolyte mist consisting of large electrolyte particles moves downward by the gravity and is absorbed by the return member 11 before the gas reaches the barrier 12. The heat generated by a voltage loss in the active component 3 is transmitted to the gas separating plates 2 via the anode base material 4, the cathode base material 5, the anode reserve plate 6 and the cathode reserve plate 7 and is absorbed by cooling plates (Not shown) inserted into the fuel cell at a pitch corresponding to several single cells. Since the barrier 12 is in contact with the gas separating plate 2, heat is transmitted from the gas separating plate 2 to the barrier 12. However, the barrier 12 is maintained at a temperature lower than that of the oxidant gas flow paths 9 because the greater part of the surface of the barrier 12 contacts the atmosphere in the manifold, the temperature thereof being much lower than that of the active component 3. If, in the case of a phosphoric acid type of fuel cell, the temperature of the reaction gas flow path is about 200° C., the temperature of the barrier 12 is lower than the former by 20° to 30° C., that is, the barrier 12 is maintained at a temperature of 170° to 180° C. As in the case of the vapor pressure of an ordinary electrolyte and as disclosed in a document (INDUSTRIAL AND ENGINEERING CHEMISTRY Vol. 44, No. b 3, pp. 615 (1952), EARL H. BROWN and CARLTON D. WHITT), the increase in the rate at which phosphoric acid is evaporated is accelerated at about 200° C., as the temperature increases. Therefore a substantial amount of phosphoric acid is condensed if the temperature decreases to the extent of from 20° to 30° C. In consequence, when the reaction gas collides with the barrier 12, the phosphoric acid is absorbed by the porous material of the barrier 12 while the reaction gas and generated water vapor are discharged in such a manner that they permeate the barrier 12 or they pass over this barrier by rising thereabove. Part of the phosphoric acid also moves upward without permeating the barrier 12, but it is cooled and loses speed by the consumption of heat and kinetic energy due to an increase in the potential energy so that the majority of the mist falls and is absorbed by the barrier 12 while failing to follow the reaction gas generated water vapor. Similarly, the majority of the phosphoric acid vapor is cooled and condensed into mist and is absorbed by the barrier 12. The amount of phosphoric acid absorbed by the barrier 12 made of a porous material is returned to the cathode reserve plate 7 via the return member 11 by virtue of capillary attraction.

Since the reaction gas flow paths are not filled with any material, there is substantially no pressure loss in the phosphoric acid recovery structure in accordance with the present invention.

The provision of the return member 11 is not always necessary, and it is possible to return the electrolyte to the cathode reserve plate 7 by the capillary attraction of irregularities formed in the surface of the receiver 10. However, the return member 11 formed of a porous material enables the recovered phosphoric acid to be returned more rapidly.

It is not always necessary to form the whole of the barrier 12 from a porous material. However, it is preferable to use the porous material as much as possible in terms of improvement in the electrolyte recovery rate because the area of contact between the barrier 12 and the exhaust gas is increased if the proportion of the porous material in the barrier 12 is increased.

In the above-described embodiment, the phosphoric acid recovery structure, namely, the receivers 10 and the barriers 12 are provided in the oxidant gas outlet manifold 15 alone. This s because, in the case of a phosphoric acid fuel cell, the gas flow rate on the oxidant gas-side is much higher than that on the fuel gas-side, and the rate at which phosphoric acid is evaporated and the rate at which mist is generated are also high on the former. However, the same structure may be provided inside the fuel gas outlet manifold 17 in order to further increase the phosphoric acid recovery rate.

The receivers 10 in accordance with the present invention function to recover certain amounts of electrolyte flowing out together with reaction gas and dripping along the side surface of the stacked-cell body in such a manner that they receive the electrolyte and return it to the component cells. The receivers 10 also function to maintain the distance between the barriers 12 and the active components 3 in order to prevent occurrence of excessive pressure loss of the reaction gas as well as to maintain the barriers 12 at lower temperatures.

The structure in accordance with the present invention also enables the fuel cell to be easily replenished with phosphoric acid. To effect this, he electrolyte may be made to successively drip from the upper component cell onto the receivers 10, it may be directly dropped onto the receivers 10 or the barriers 12, or it may be made to permeate the barriers 12 by using a sprayer.

Figure 5:
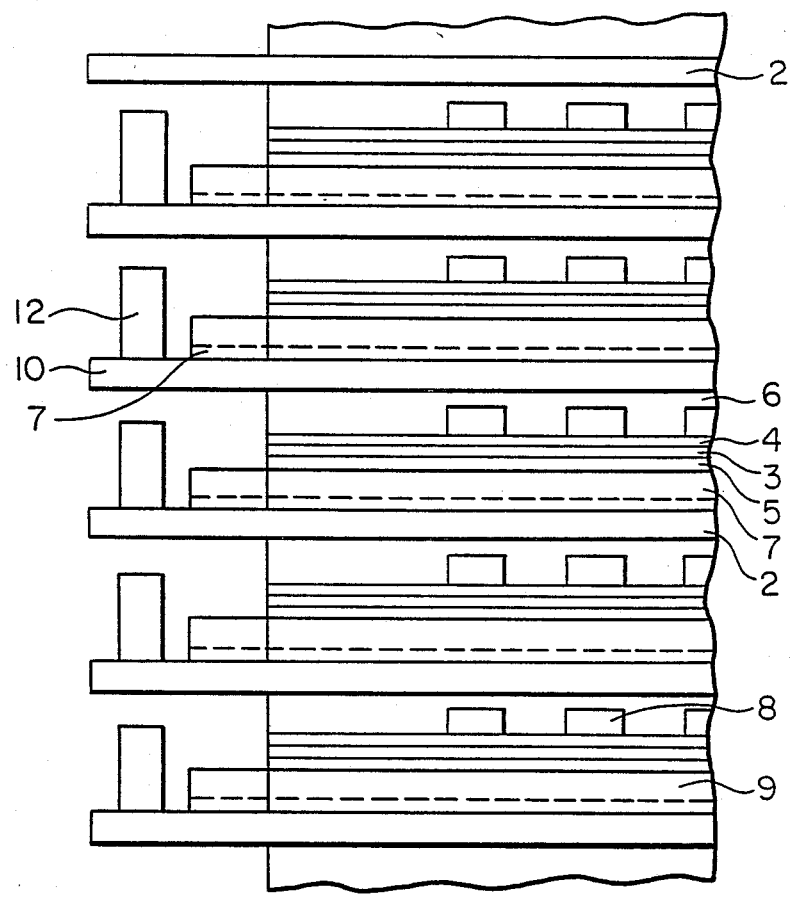
FIG. 5 is a side view of a stacked type of fuel cell which represents another embodiment of the present invention.

As shown in FIG. 5, the cathode receive plate 7 which constitute a portion of each single cell and which is formed from a porous material may be extended toward the receiver 10 so that it serves as the return member 11, or it may be connected to the barrier 12.

What is claimed is:

1. A stacked type fuel cell comprising:
 a stacked-cell body formed of a plurality of gas separating plates and plurality of single cells alternately stacked on each other, each of said single cells having an electrolyte matrix, anode and cathode electrode layers disposed on opposing surfaces, respectively, of said electrolyte matrix, an anode reserve plate having at least one channel serving as a fuel gas flow path, and a cathode reserve plate having at least one channel serving as an oxidant gas flow path, said anode reserve plate and said cathode reserve plate being respectively disposed on the reverse surfaces of said anode layer and said cathode layer, said fuel gas flow path and said oxidant gas flow paths comprising reaction gas flow paths;
 reaction gas supply and reaction gas discharge manifolds disposed on side surfaces of said stacked-cell body;
 at least one receiver extending from said side surface of said stacked-cell body inside said discharge manifold, said receiver being adapted to receive surplus electrolyte falling along said side surface; and
 a barrier disposed on said receiver and adapted to catch an amount of electrolyte discharged from at least one of said reserve plates while partially opening the outlet of the corresponding one of said reaction gas flow paths.

2. A fuel cell according to claim 1, wherein the height of said barrier in the stacking direction is greater than that of the oxidant gas flow path of an associates reserve plate in the stacking direction.

3. A fuel cell according to claim 1, wherein said receiver is formed as an extension of a portion of said gas separating plate projecting outward from said side surface of said stacked-cell body.

4. A fuel cell according to claim 1, wherein a return member for returning the electrolyte is provided on said receiver between said barrier and said single cell.

5. A fuel cell according to claim 4, wherein at least part of said return member is formed from a porous material.

6. A fuel cell according to claim 1, wherein said receiver is disposed in said manifold through which the oxidant gas is discharged.

7. A fuel cell according to claim 1, wherein at least part of said barrier is formed from a porous material.

8. A fuel cell according to claim 4, wherein said barrier is integral with said return member.

9. A fuel cell according to claim 1, wherein said receiver and said barrier are provided for each of said single cells.

10. A fuel cell according to claim 9, wherein an amount of electrolyte caught by said receiver provided for each single cell is returned to the corresponding single cell.

* * * * *